United States Patent

Hammer et al.

[11] Patent Number: 6,119,455
[45] Date of Patent: Sep. 19, 2000

[54] PROCESS AND DEVICE FOR PURIFYING EXHAUST GASES CONTAINING NITROGEN OXIDES

[75] Inventors: Thomas Hammer, Hemhofen; Jörg Kieser, Forchheim, both of Germany

[73] Assignee: Siemens Aktiengesellschaft, Munich, Germany

[21] Appl. No.: 09/259,375

[22] Filed: Feb. 26, 1999

Related U.S. Application Data

[63] Continuation of application No. PCT/DE97/01768, Aug. 18, 1997.

[30] Foreign Application Priority Data

Aug. 30, 1996 [DE] Germany .......................... 196 35 232

[51] Int. Cl.$^7$ ..................................................... F01N 3/10
[52] U.S. Cl. ................. 60/301; 60/275; 60/274; 60/311; 60/299; 422/186.04; 422/186.05; 204/177
[58] Field of Search ............................ 60/275, 299, 274, 60/300, 301, 303, 311; 204/177; 422/186.04, 186.05

[56] References Cited

U.S. PATENT DOCUMENTS

| | | |
|---|---|---|
| 3,562,127 | 2/1971 | Wooton et al. . |
| 4,631,076 | 12/1986 | Kurihara et al. .......................... 55/283 |
| 4,657,738 | 4/1987 | Kanter et al. . |
| 5,413,769 | 5/1995 | Okazaki et al. .................... 422/186.07 |
| 5,478,531 | 12/1995 | Yoshikawa ............................... 422/177 |
| 5,492,677 | 2/1996 | Yoshikawa ............................... 422/174 |
| 5,698,012 | 12/1997 | Yoshikawa .................................. 96/47 |

FOREIGN PATENT DOCUMENTS

| | | |
|---|---|---|
| 0 626 505 A2 | 11/1994 | European Pat. Off. . |
| 0 627 263 A1 | 12/1994 | European Pat. Off. . |
| 35 15 143 A1 | 10/1985 | Germany . |
| 40 42 028 A1 | 7/1992 | Germany . |
| 42 31 581 A1 | 3/1994 | Germany . |
| 43 36 768 A1 | 6/1994 | Germany . |
| 43 17 964 C2 | 4/1996 | Germany . |

OTHER PUBLICATIONS

International Application WO 97/03746 (Hammer et al.), dated Feb. 6, 1997.

Primary Examiner—Thomas Denion
Assistant Examiner—Binh Tran
Attorney, Agent, or Firm—Herbert L. Lerner; Laurence A. Greenberg; Werner H. Stemer

[57] ABSTRACT

In particular for exhaust-gas purification, different processes have been proposed. According to the invention, the polluted exhaust gas flows through a reactor volume to which non-thermal gas discharges are applied, while being brought into contact with a solid reducing agent at least once, and preferably several times. The reducing agent can, in particular, consist of carbon fibers. A suitable device for combining dielectric barrier discharges with the reduction has means for field enhancement substantially periodically spaced in the reactor.

26 Claims, 5 Drawing Sheets

PROCESS AND DEVICE FOR PURIFYING EXHAUST GASES CONTAINING NITROGEN OXIDES

CROSS-REFERENCE TO RELATED APPLICATION

This is a continuation of copending International Application PCT/DE97/01768, filed Aug. 18, 1997, which designated the United States.

BACKGROUND OF THE INVENTION

1. Field of the Invention

The invention relates to a process for purifying exhaust gases containing nitrogen oxides, in particular an exhaust gas of a combustion engine. The invention further relates to a device for carrying out such a process.

Because of the formation of ozone from nitrogen oxides which takes place in bottom air layers predominantly in summer, there is a compelling requirement for effectively removing nitrogen oxides from the exhaust gases of combustion engines. For spark-ignition engines running with an excess air factor =1, three-way catalysts remove, in addition to nitrogen oxides, uncombusted hydrocarbons and carbon monoxide as well. For diesel engines and lean-burn engines (i.e. spark-ignition engines working with an excess air factor >1), these catalysts cannot be used on account of the high oxygen content in the exhaust gas and a type of catalyst which can be used for such exhaust gases with satisfactory pollution abatement rate and useful life has not yet been found.

With previously published DE A 42 31 581 and WO A 94/6676, plasma processes for purifying such exhaust gases with high oxygen content have already been disclosed. Furthermore, German Patent Applications 195 25 749.9 and 195 25 545.0, which were not yet published at the priority date of the present application, have also disclosed combinations of gas discharge and catalytically active wall materials for achieving good energy efficiency in breaking down pollutants. This combination might also be sensible because new discoveries have given reason to suspect that, in silent discharges or other suitable plasma processes, nitrogen oxides are predominantly oxidized to form $HNO_2$ and $HNO_3$ instead of being reduced to the desired products $N_2$ and $O_2$. There has incidentally been research into plasma-induced catalysis, but this gives little hope of catalytic materials which, in combination with gas discharges, promote the reduction of nitrogen oxides to form $N_2$ and $O_2$ to such a great extent that the oxidation to form acids can be neglected. Either the catalytic material also promotes oxidation, or oxidative adsorption takes place. During oxidative adsorption, the surface of the catalyst soon becomes saturated. This means that such a catalyst has, for example in a steady-state system, to be regenerated by desorption and the pollutants then released have to be neutralized. This problem can be avoided according to the prior art only if a reducing agent such as, for example, fuel, is added to the exhaust gas in a high proportion. This in turn increases the fuel consumption significantly and causes problems with the emission of incompletely reacted reducing agents.

In other research, it has been found that it is possible to achieve high degrees of breakdown for nitrogen oxides by adding ammonia as a reducing agent to the exhaust gas before the treatment in the discharge. However, this entails the following problems: first, a motor vehicle equipped with such an exhaust-gas purification system must carry ammonia or a less harmful related substance from which ammonia can be generated; second, the addition of this far from harmless reducing agent must be very accurately controlled, in order to avoid leakage, and third, the resulting ammonium nitrate dust must be filtered from the exhaust gas. Because of these problems, this solution is not currently acceptable to the automobile industry. There has to date been no other reducing agent in liquid or gaseous form with which reduction even approximately as efficient as with ammonia can be achieved. However, considerably more promising for purifying diesel exhaust gases has been research with activated carbon fibers, possibly doped with catalytically active metals, the fibers functioning here as a solid reducing agent: $NO_x$ decomposition degrees of up to 70% have thereby been achieved. However, this presupposes correct pretreatment of the fibers and an exhaust-gas temperature which is neither too high nor too low. If the exhaust-gas temperature is too low, as in cold starting, engine idling or under low load, the degree of decomposition is low, whereas at too high an exhaust-gas temperature, accelerated oxidation of the fibers by oxygen in the exhaust gas, i.e. erosion of the fibers, takes place. On account of the thermal inertia of typical exhaust-gas systems in motor vehicles it is scarcely possible, and not even sensible in energy terms, to control the temperature of the exhaust-gas cleaning element actively. There is thus a need for a way of reducing nitrogen oxides using carbon fibers other than by controlling the temperature.

EP 0 621 263 A1 discloses a process for reducing nitrogen oxides in diesel exhaust gas using activated carbon, which is combined with an electrostatic soot-filtering process. In order to filter the soot, the soot particles are charged by applying an electric voltage so that they can subsequently be deposited electrostatically. Merely by virtue of the way in which the electrostatic soot filter operates, it does not have a direct effect on the nitrogen oxide reduction. One indirect effect could consist in the soot collected in the filter itself acting as a solid reducing agent.

SUMMARY OF THE INVENTION

The object of the invention is, therefore, to provide an improved process suitable for purifying exhaust gases of motor vehicle engines. A further object is to provide a suitable device.

The object is achieved according to the invention by a process in which the exhaust gas containing nitrogen oxides flows through a reactor volume to which non-thermal gas discharges are applied, while being brought into contact one or more times with a solid reducing agent, by means of which the exhaust gas is firstly excited and nitrogen oxides contained therein then reduced to elemental nitrogen. Non-thermal gas discharges can be silent discharges, dielectric barrier discharges, corona discharges, and pulsed high-pressure glow discharges. Preferably, carbon fibers are used as the reducing agent. Other carbon-containing materials may also be used according to the invention as the solid reducing agent. Advantageously, solid reducing agents are consumed as required and cannot therefore be apportioned incorrectly.

In a specific device for carrying out the process according to the invention, an exhaust-gas purifying element comprises a reactor for applying dielectric barrier discharges as non-thermal gas discharges to the exhaust gas, and the reactor contains the solid reducing agent and means for field enhancement at substantially periodic spacing. Such means for field enhancement can be sharp edged disks spaced along an electrode rod of the reactor. Depending on the discharge gap, which may range from 1 mm to 10 mm, the spacing between the disks may range from 2 mm to 20 mm or even more. The disks can be circular, particularly in a coaxial reactor; in a rectangular reactor its geometry can be accommodated, suitably with trapezoidal disks. The dielectric barrier discharge is thereby suitably concerted with the reduction of the exhaust gas containing nitrogen oxides to elemental nitrogen.

Thus, in the invention, radicals as well as vibrationally excited molecules, whose lifetime is in the millisecond range, are efficiently produced in non-thermal gas discharges at or near atmospheric pressure with the aid of silent discharges. It has been found that the reaction rates of vibrationally excited molecules are considerably higher than those of unexcited molecules since the vibrational excitation carries with it energy which cannot be converted as rapidly into heat as, for example, rotational excitation. This energy can then be used to drastically increase the probability of reactions with a threshold energy below 1 eV. It is also possible to promote surface adsorption in this way.

In decomposing nitrogen oxides in exhaust gases according to this invention to produce nonpolluting products such as elemental nitrogen, it is advantageously possible to use a solid reducing agent made of natural carbon-containing materials such as, for example, the aforementioned carbon fibers, or from polymer fibers having suitable electrical, thermal and chemical properties, combined with a non-thermal gas discharge at approximately atmospheric pressure. Suitable polymers have melting points and ignition temperatures high enough for use in the presence of exhaust gas, preferably at least 350° C., and are preferably substantially free of halogen. Thus, polymer fibers that can be used include cross-linked polyethylene, polyurethane, and polyimide. The solid reducing agent can serve either as electrode material or as dielectric within the reactor. If the former, the conductivity should be high, preferably above 0.5/ohm meter; if used as a dielectric, the conductivity should be low, preferably below $5 \times 10^{-6}$/ohm meter and the dielectric permitivity should be low, for example below 10 and preferably below 3.5 to avoid electrical losses.

The gas discharge has the purpose in this case, through excitation processes, to initiate and/or control the heterogeneous reduction of the nitrogen oxides at the surface of the reducing agent. To this end, it is necessary to ensure that the gas discharge is in direct contact with the reducing agent, or that the time from the gas-discharge excitation of the exhaust gas to the contact with the reducing agent is less than the lifetime of the excitation produced in the gas discharge. The excitation can, for example, be in the form of radical formation, vibrational excitation, metastable electronic excitation in molecules and the formation of molecules highly susceptible to reaction or adsorption. The lifetime of these forms of excitation is sometimes in the range of several milliseconds. Flow processes are therefore sufficient for transporting the exhaust gas excited in the gas-discharge zones fast enough to the reducing agent.

In order to ensure the selectivity of the process, the reducing agent can be doped with catalytically active metals. Such metals can be alkali metals, alkaline earth metals, or transition metals, especially potassium, calcium, and iron. Depending on the nature of the use, the reducing agent can also be in the form of bulk material which is preferably microporous to increase the surface area and is in laminar or granular form instead of fiber.

Other features which are considered as characteristic for the invention are set forth in the appended claims.

Although the invention is illustrated and described herein as embodied in a process and device for purifying exhaust gases containing nitrogen oxides, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
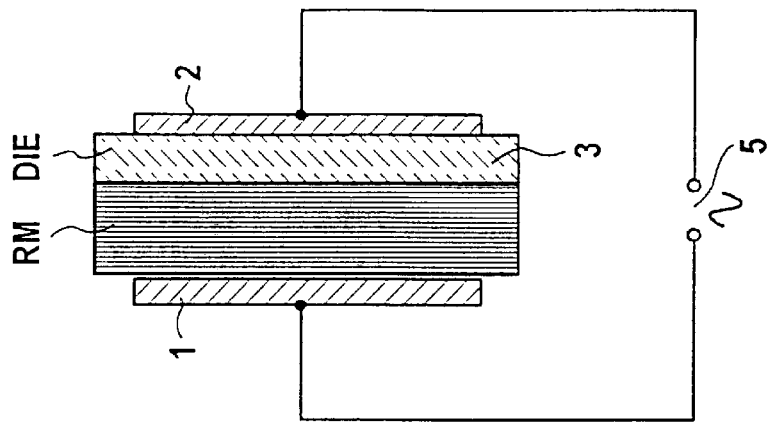
FIGS. 1 to 6 show different possible ways of using solid reducing agents in devices for purifying exhaust gases using the principle of dielectric barrier discharge in a sectional representation, with alternating cross sections of planar arrangements and hollow cylindrical arrangements respectively being shown.

The figures will be explained below, sometimes in combination.

In the individual figures, alternative coaxial or planar reactors for producing dielectric barrier discharges are represented, these are referred to here as DBE elements. According to the prior art, such elements usually consist of a first metal electrode 1 and a counterpart electrode 2, which is provided with a dielectric 3. In order to generate the dielectric barrier ("silent") discharges, the electrodes are connected to a high-voltage source 5 with sinusoidal AC voltages or periodic pulsed voltages having frequencies in the range of from 1 kHz to a few 100s of kHz, the amplitude ranging from a few kV to a few 10s of kV depending on the discharge length and/or electrode shape.

Especially in FIGS. 1 to 6, coaxial or planar reactors for producing dielectric barrier discharges (DBE) are represented, in which, depending on its conductivity, a solid reducing agent is produced either as an electrode (RE), as a dielectric (RD) or as an additional gas-permeable layer (RM). When present as an electrode (RE), the conductivity of the solid reducing agent should be high, for example well above 0.5/ohm meter; when used as a dielectric (RD) or an additional layer (RM), the conductivity should be low, for example below $5 \times 10^{-6}$/ohm meter and the dielectric permitivity should be low, for example below 10, preferably below 3.5.

Figure 2:
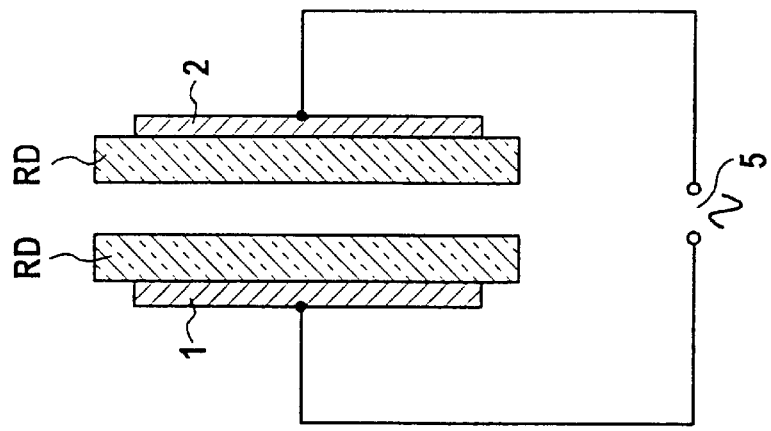
Figure 3:
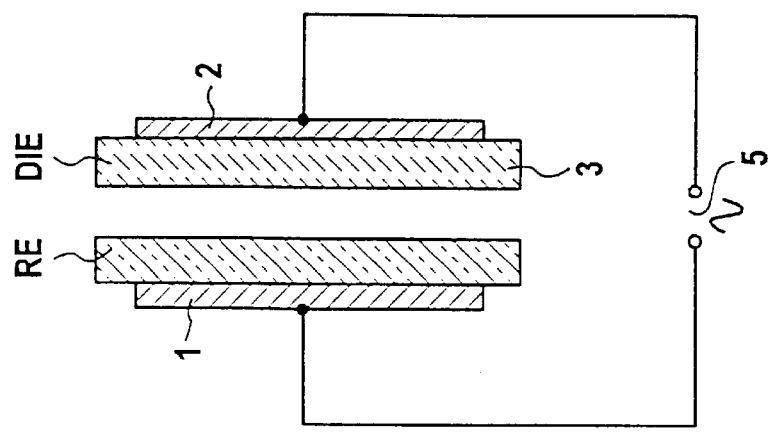
Figure 6:
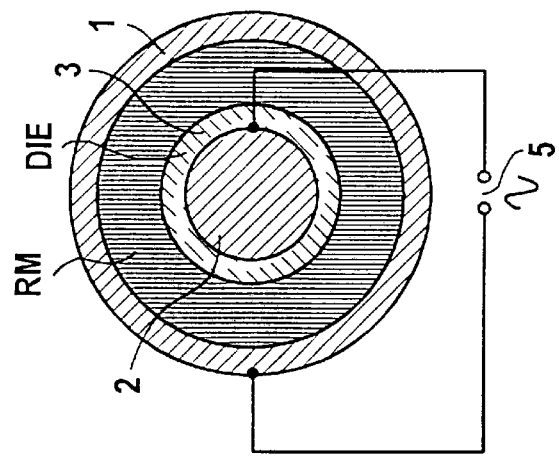
Figure 5:
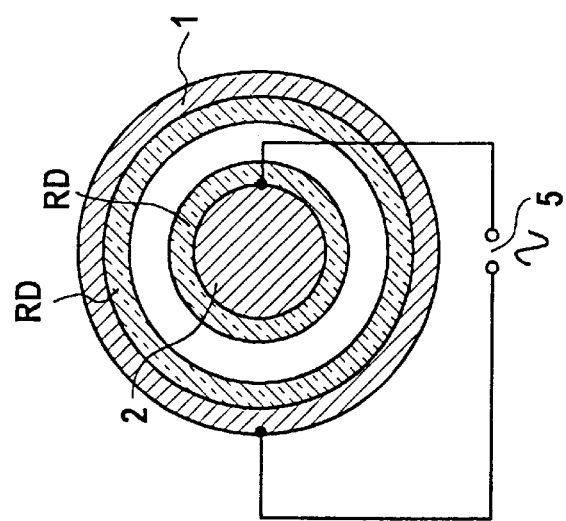
Figure 4:
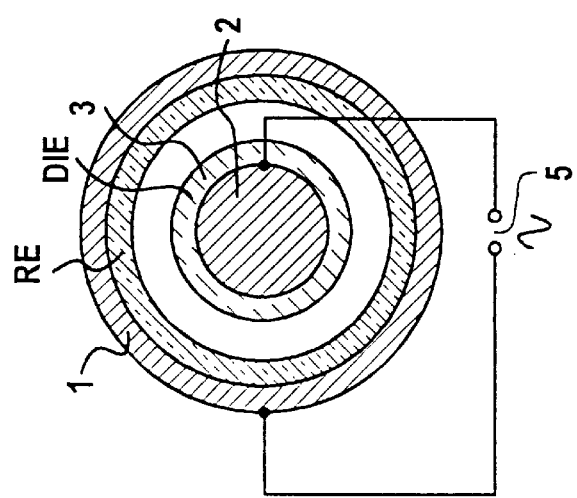

Accordingly, FIGS. 1 and 2 contain the first alternative, FIGS. 3 and 4 the second alternative and FIGS. 5 and 6 the third alternative. In the first alternative, the conductive reducing agent RE is applied to the electrode 1 with the electrode 2 being provided in the known way with the dielectric barrier DIE.

In the second alternative, according to FIGS. 3 and 4, a dielectric barrier RD, which also has a reducing action, is applied to both electrodes 1 and 2, while in the third alternative the reducing material RM has low conductivity and is gas-permeable. Especially in this alternative, direct contact between the discharge and the reducing agent is achieved. In the case of oxygen-containing exhaust gases, however, increased erosion of the reducing agent may arise with this alternative.

Figure 7:
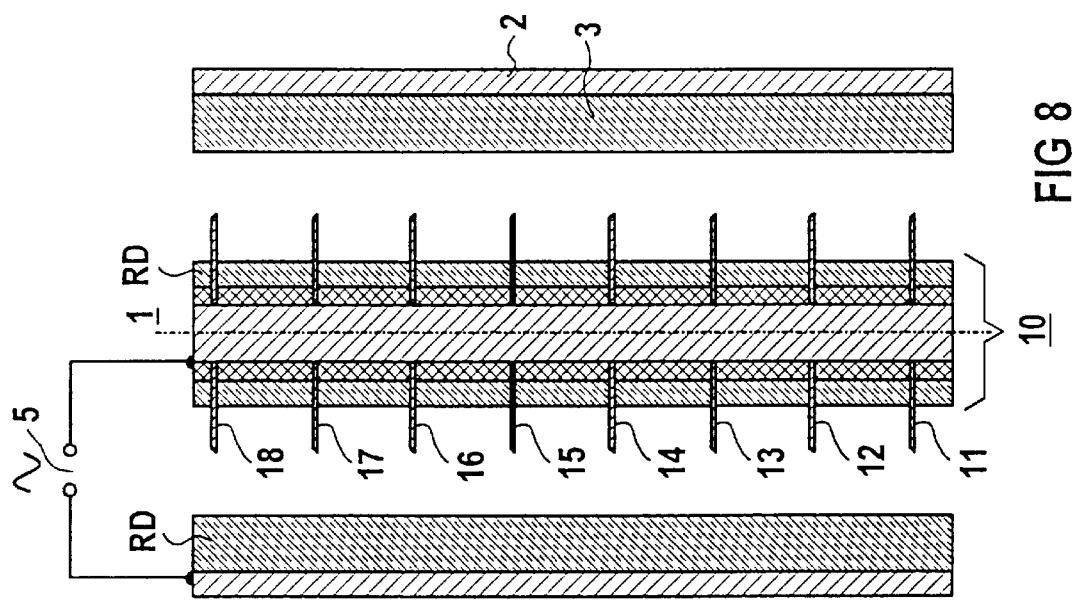
FIGS. 7 and 8 show longitudinal sections of two rotationally symmetrical reactors having additional means for field enhancement.
Figure 8:
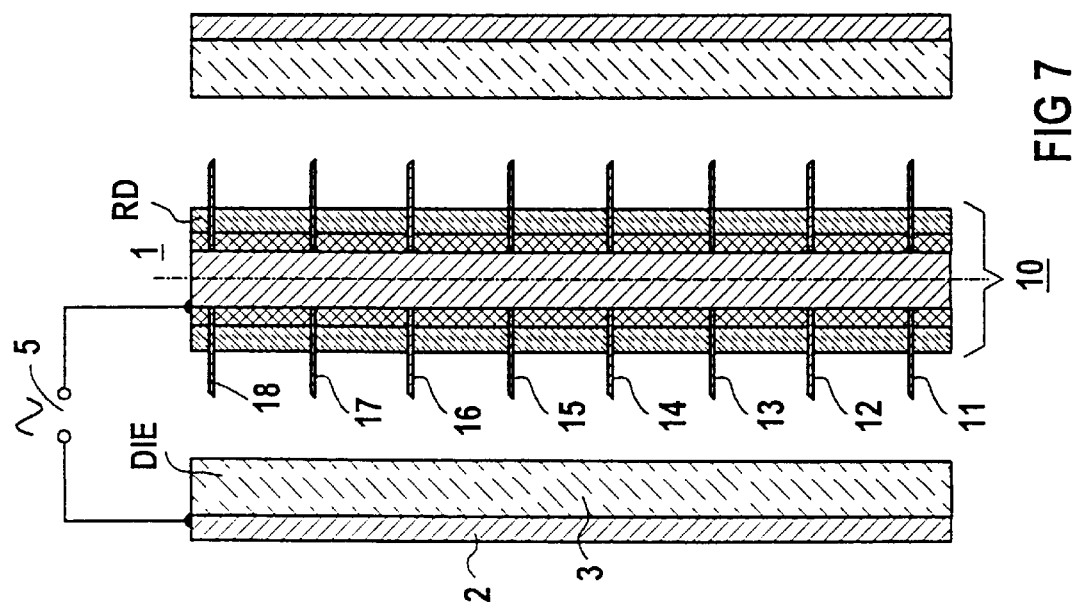

In FIGS. 7 and 8, there are coaxial DBE reactors with additional annular blade electrodes 11, 12, . . . , 18 for subdividing the reactor volume, in the flow direction of the exhaust-gas stream, into a plurality of discharge zones and discharge-free zones. As in the alternatives according to FIGS. 3 or 4, the reducing agent RD is, according to its electrical properties, either arranged in the discharge-free regions between the blade electrodes 11, 12, . . . , 18 or alternatively applied as dielectric to the cylindrical electrode 2. In the example according to FIG. 7, the exhaust gas is efficiently brought into contact with the reducing agent lying outside the main stream by the effect of turbulent flows. It should in this case be taken into account that the reducing agent has the least possible effect on the electrostatic properties of the reactor.

Figure 9:
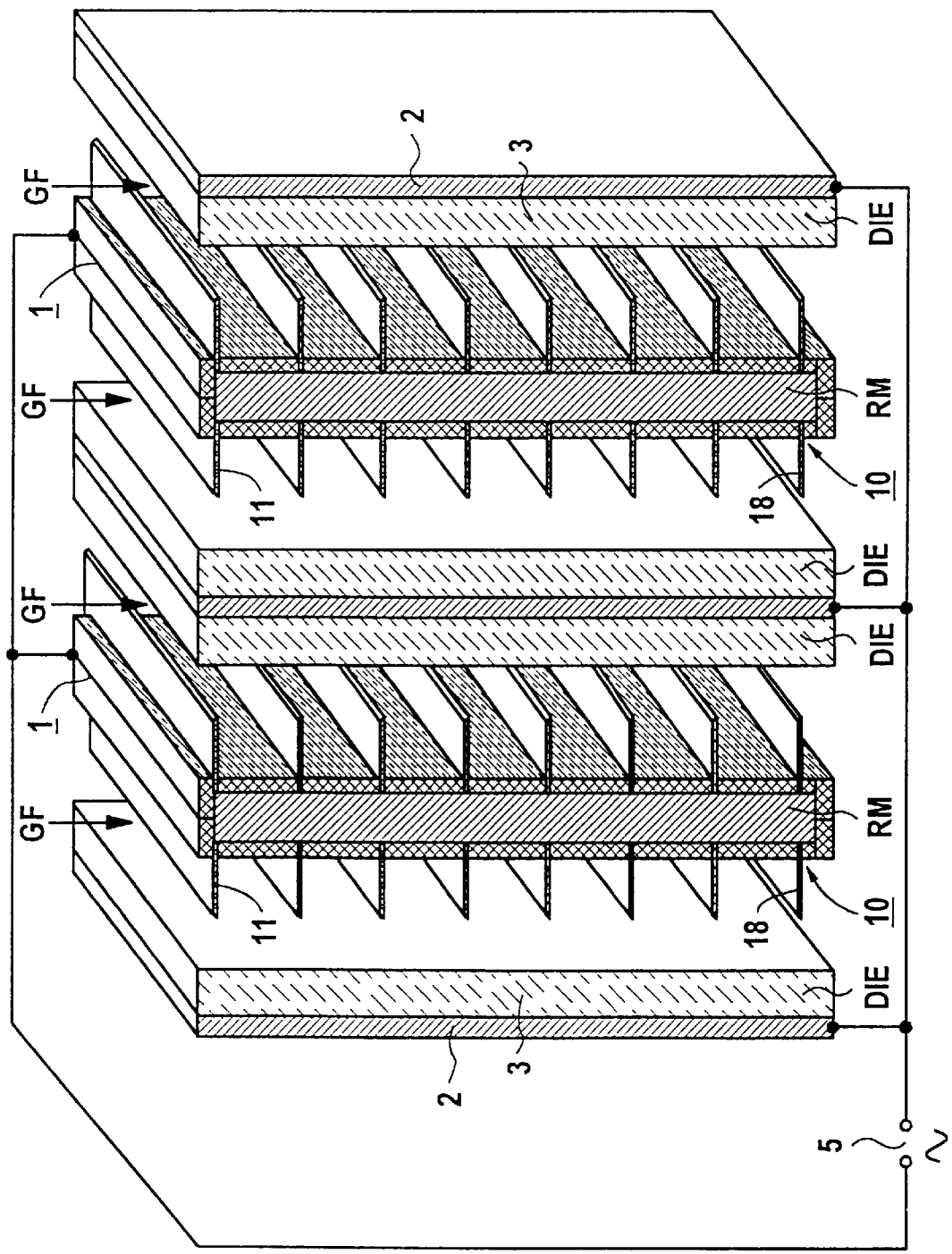
FIG. 9 shows a longitudinal section of a planar reactor with means for field enhancement.

In FIG. 9, a plurality of parallel discharge gaps are combined in planar geometry to form a reactor which contains rectangular blade electrodes 11, 12, . . . for repeatedly subdividing the reactor volume, in the flow direction of the exhaust gas, into discharge and discharge-free zones, and the reducing agent RM either in the discharge-free regions between the blade electrodes 11, 12, . . . , 18 or alternatively as flat dielectric. Here again, the exhaust gas is efficiently brought into contact with the reducing agent lying outside the main stream through the effect of turbulent flow. In contrast to the coaxial arrangements according to FIGS. 7 and 8, the reducing agent may in this case be arranged in the form of plates or felt mats in the space between two blade electrodes. This simplifies the design and replacement of the reducing agent in the case of extended utilization of the arrangement. As represented in detail in FIG. 9, large flow cross sections may, in particular, also be produced by connecting a plurality of planar discharge elements in parallel.

Figure 10:
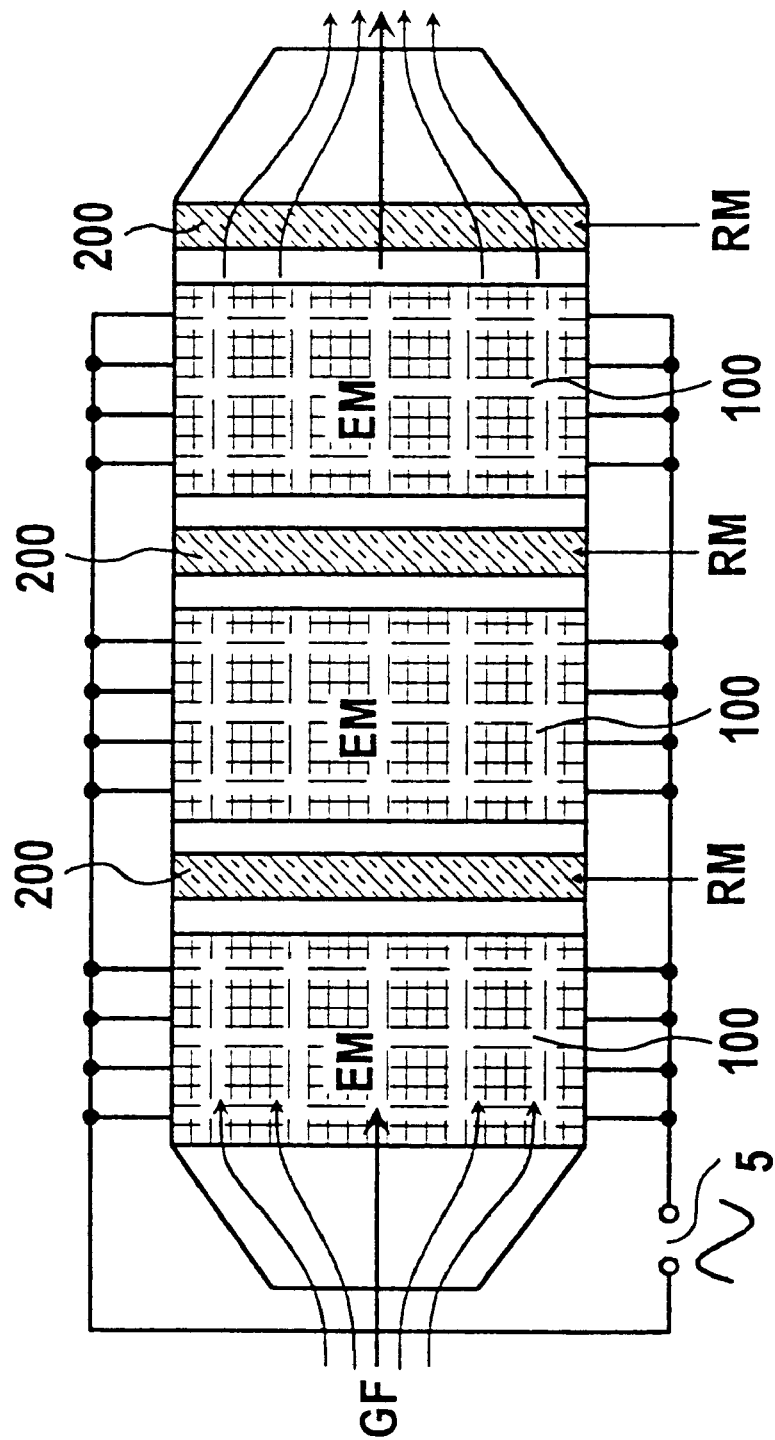
FIG. 10 shows an exhaust-gas purifying element made up of individual modules in longitudinal section.

In the illustrative embodiment according to FIG. 10, individual units are used to construct a modularly constructed exhaust-gas purification system in which, in addition to the arrangement in an individual module 100, it is also possible for reducing agents RM to be arranged as additional units 200 between the individual EM modules 100. Such an arrangement is sensible primarily when the products of plasma-induced reactions of pollutants with radicals in the discharge modules have long lifetimes or are even stable under the prevailing conditions but are more readily decomposed by the reducing agent than the original pollutants.

Carbon fibers which are modified by known chemical or physical processes (see, for example Ma J., Illan-Gomez et al., "NO Reduction by Activated Carbon. Some Mechanistic Aspects of Uncatalyzed and Catalyzed Reactions" in J. A. Pajares, J. M. D. Tascon (editors): Coal Science, Elsevier Science B.V. (1995), p. 1799–1902) may in particular be used as the reducing agent, so that the reducing activity is improved and is effective in a broad temperature range. To this end, the carbon fibers are for example modified by etching using liquid or gaseous agents or by heat treatment in inert or oxidizing atmospheres. The carbon fibers can also be doped with metals such as potassium, calcium, or iron. Other natural carbon-containing materials such as coal or vegetable fibers, suitably pretreated by a controlled pyrolysis, can also be used as the reducing agent. Suitable vegetable fibers include cotton, flax, hemp, jute, and ramie. The reducing agent can also consist of substantially halogen-free polymer fibers including cross-linked polyethylene, polyacrylonitrile, polyamide, polyester, polyimide, and polyurethane fibers.

In particular, such reducing agents can have sufficient conductivity to also constitute the electrode layer applied to the electrode 2 in FIGS. 1 and 2. If, however, the reducing agent has suitable dielectric properties, including low conductivity and low permitivity, it can also serve according to FIGS. 3 and 4 as the dielectric barrier of the electrode used to produce dielectric barrier discharge.

We claim:

1. A process for the reduction of nitrogen oxides in exhaust gases, comprising the steps of flowing exhaust gas containing nitrogen oxides through a reactor volume, applying a non-thermal gas discharge to the exhaust gas, thereby exciting the exhaust gas, and contacting the exhaust gas at least once with a solid reducing agent, thereby reducing the nitrogen oxides.

2. The process according to claim 1, in which the solid reducing agent comprises carbon fibers.

3. The process according to claim 2, in which the carbon fibers are modified by etching.

4. The process according to claim 2, in which the carbon fibers are doped with a metal selected from the group consisting of alkali metals, alkaline earth metals, and transition metals.

5. The process according to claim 2, in which the carbon fibers are modified by heat treatment.

6. The process according to claim 1, in which the solid reducing agent is coal.

7. The process according to claim 1, in which the solid reducing agent comprises substantially halogen free polymer fibers.

8. The process according to claim 1, in which the solid reducing agent acts as an electrode.

9. The process according to claim 1, in which the solid reducing agent serves as wall material.

10. The process according to claim 1, in which the reactor volume is at least partly filled with a gas-permeable reducing agent acting as a dielectric.

11. The process according to claim 1, in which the non-thermal gas discharge comprises a silent discharge.

12. The process according to claim 1, in which the non-thermal gas discharge comprises a corona discharge.

13. The process according claim 1, in which the non-thermal gas discharge comprises a pulsed high-pressure glow discharge.

14. The process according to claim 1, in which the solid reducing agent is vegetable fiber.

15. The process according to claim 1, in which the solid reducing agent serves as a dielectric barrier of an electrode used to drive dielectric barrier discharges.

16. A device for reducing nitrogen oxides contained in the exhaust gas of a combustion engine, comprising an exhaust gas line conducting exhaust gas of a combustion engine communicating with an exhaust-gas purifying element with a high voltage source for applying a dielectric barrier discharge to the exhaust gas, thereby exciting the exhaust gas, and a reactor containing a solid reducing agent for reducing the nitrogen oxides and means for field enhancement at substantially periodic spacing.

17. The device according to claim 16, in which the means for field enhancement are disks with a blade-like edge inserted in planar electrode structures.

18. The device according to claim 17, in which the blade-like edge is serrated.

19. The device according to claim 16, in which the exhaust-gas purifying element is constructed modularly from a plurality of units.

20. The device according to claim 19, in which solid gas-permeable reducing agents are arranged as separate units between the individual modules.

21. The device according to claim 16, in which the means for field enhancement are disks spaced apart from 2 mm to 20 mm.

22. The device according to claim 16, in which the means for field enhancement are annular rings with a blade-like edge inserted in coaxial electrode structures.

23. The device according to claim 22, in which the blade-like edge is serrated.

24. The device according to claim 16, in which the high voltage source affords sinusoidal AC voltages or periodic pulsed voltages having frequencies in the range from 1 kHz to a few 100s of kHz and amplitudes in the range from a few kV to a few 10s of kV.

25. The device according to claim 16, in which the solid reducing agent is an electrode having a conductivity greater than 0.5/ohm meter.

26. The device according to claim 16, in which the solid reducing agent has a conductivity less than $5 \times 10^{-6}$/ohm meter.

* * * * *